(12) United States Patent
Clossen-Von Lanken Schulz et al.

(10) Patent No.: US 10,124,419 B2
(45) Date of Patent: Nov. 13, 2018

(54) MILLING DEVICE AND METHOD FOR MILLING WITHIN A SLOT

(71) Applicant: SIEMENS AKTIENGESELLSCHAFT, München (DE)

(72) Inventors: Michael Clossen-Von Lanken Schulz, Issum (DE); Stefan Obermayr, Duisburg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 18 days.

(21) Appl. No.: 15/346,759

(22) Filed: Nov. 9, 2016

(65) Prior Publication Data

US 2017/0136556 A1    May 18, 2017

(30) Foreign Application Priority Data

Nov. 16, 2015  (DE) .................. 10 2015 222 529

(51) Int. Cl.
| | |
|---|---|
| B23C 3/28 | (2006.01) |
| B23C 3/34 | (2006.01) |
| B23Q 9/00 | (2006.01) |

(52) U.S. Cl.
CPC .............. B23C 3/34 (2013.01); B23Q 9/0007 (2013.01); *B23C 2215/52* (2013.01); *B23C 2220/366* (2013.01); *Y10T 409/306384* (2015.01)

(58) Field of Classification Search
CPC . Y10T 409/306384; Y10T 409/306496; Y10T 409/306272; Y10T 409/306608; Y10T 409/306552; B23C 3/28; B23C 3/34; B23C 2220/366; B23C 2215/52; B23Q 9/0007; B23Q 9/0014; B23Q 9/0028

USPC .......................................... 30/475, 476, 477
See application file for complete search history.

(56) References Cited

U.S. PATENT DOCUMENTS

| | | | | |
|---|---|---|---|---|
| 1,394,564 A | * | 10/1921 | Lindgren ............. | B23D 59/002 144/119.1 |
| 1,532,683 A | * | 4/1925 | Rayl ...................... | B27C 5/02 144/134.1 |
| 2,146,458 A | * | 2/1939 | Willard ................ | B23Q 9/0028 409/182 |
| 3,106,133 A | * | 10/1963 | Arpaio, Jr. ........... | A63B 45/00 144/134.1 |
| 3,192,801 A | * | 7/1965 | Gingras ................ | B23G 1/16 144/93.1 |

(Continued)

OTHER PUBLICATIONS

Non-english Chinese Office Action dated Aug. 1, 2018, Application No, 201611010207.2.

*Primary Examiner* — Daniel Howell
(74) *Attorney, Agent, or Firm* — Schmeiser, Olsen & Watts, LLP

(57) ABSTRACT

A milling device is provided, having a milling tool that rotates about a tool rotation axis, wherein the milling device has a slide, and in that the milling tool is held on a pivot axis that extends transversely, in particular perpendicular, to the tool rotation axis and through the slide, wherein the slide is designed and the position of the milling tool is selected such that, during milling, a traversing movement is effected by manually moving the slide and advance is effected by pivoting the milling tool about the pivot axis. Also provided is a method for milling within a slot of a component, in particular within a blade root receiving slot of a turbomachine, using a milling device.

20 Claims, 5 Drawing Sheets

(56) References Cited

U.S. PATENT DOCUMENTS

| | | | | |
|---|---|---|---|---|
| 4,572,715 A | * | 2/1986 | Wolff | B23B 47/287 |
| | | | | 144/154.5 |
| 4,603,719 A | * | 8/1986 | Durney | B27M 1/08 |
| | | | | 144/134.1 |
| 4,674,548 A | | 6/1987 | Mills et al. | |
| 4,729,698 A | * | 3/1988 | Haddon | B25F 3/00 |
| | | | | 144/106 |
| 4,792,248 A | * | 12/1988 | Mercurio | B23C 1/20 |
| | | | | 29/564 |
| 4,947,908 A | * | 8/1990 | O'Banion | B27C 5/10 |
| | | | | 144/136.95 |
| 5,161,291 A | | 11/1992 | Guenther | |
| 5,368,423 A | * | 11/1994 | Hanna | B23C 3/00 |
| | | | | 166/55.7 |
| 5,876,161 A | * | 3/1999 | Ikola | B23B 41/04 |
| | | | | 408/110 |
| 6,033,166 A | * | 3/2000 | Hampel | B23C 3/005 |
| | | | | 409/175 |
| 2005/0198821 A1 | * | 9/2005 | Reville | B23C 1/20 |
| | | | | 29/889.1 |

\* cited by examiner

MILLING DEVICE AND METHOD FOR MILLING WITHIN A SLOT

CROSS-REFERENCE TO RELATED APPLICATIONS

This application claims priority German Application No. 102015222529.1 having a filing date of Nov. 16, 2015, the entire contents of which are hereby incorporated by reference.

FIELD OF TECHNOLOGY

The following relates to a milling device having a milling tool that rotates about a tool rotation axis. The following also relates to a method for milling within a slot, in particular, within a blade root receiving slot of a turbomachine, using such a milling device.

BACKGROUND

Turbine rotor blades and blade root receiving slots, which are formed on the rotor and in which the turbine rotor blades are held, are subjected to very high mechanical and also chemical loads during operation of the turbine. This causes, inter alia, crack formation within the blade root receiving slots, which can greatly reduce the service life of the turbine rotor. Within the context of maintenance and repair work, crack findings are recorded accordingly, and the remaining service life of the rotor is determined by calculation. If this is inadequate, suitable countermeasures must be taken. These can involve grinding out the identified cracks. Alternatively or in addition, it is however also possible to effect a repair by means of the rotor steeples defined by the blade root receiving slots. To that end, individual worn rotor steeples can be removed and can be replaced by welding on corresponding replacement rotor steeples. It is in certain cases also possible to modify the rotor geometry and/or the blade root receiving slot geometry.

When recording crack findings, the cracks are located and their depth is determined, since the crack depth has a considerable influence on the subsequent calculations of the service life of the rotor and crack growth. Non-destructive methods, such as magnetic particle inspection or eddy current testing (ECT) are usually used for detecting cracks that are present. In order to determine the crack depth, the cracks are machined mechanically using a milling machine until the base of the crack is reached. This involves alternating between material removal and checking, using non-destructive crack testing methods, whether the base of the crack has been reached. This can also involve the use of magnetic particle inspection or eddy current testing.

However, an important drawback of this approach is that the milling is performed manually. Accordingly, the milling does not create defined and/or axially constant machining contours, making it difficult to reliably calculate the remaining service life and/or the expected crack growth.

SUMMARY

An aspect relates to a milling device of the type mentioned in the introduction, and a method for milling within a slot of a component using such a milling device, which permits reliable calculation of the remaining service life and/or of the expected crack growth.

A further aspect provides a milling device of the type mentioned in the introduction, which is characterized in that it has a slide, and in that the milling tool is held on a pivot axis that extends transversely, in particular perpendicular, to the tool rotation axis and through the slide, wherein the slide is designed and the position of the milling tool is selected such that, during milling, a traversing movement is effected by manually moving the slide and advance is effected by pivoting the milling tool about the pivot axis. If the shape of the slide is matched, for example to the shape of a slot that is to be machined, in the manner of a template, the slide permits exact guiding of the milling tool along the direction of extent of the slot, thus achieving a defined movement of the milling tool during milling. The slide also makes it possible to perform milling at hard-to-reach points within the slot. In that context, the pivot position of the milling tool can be used to set a defined advance. In all, the milling device according to embodiments of the invention thus permits the creation of defined and axially constant machining contours when determining the depth of a crack or when grinding out a crack, to name just some possible exemplary uses. After machining of cracks, the defined machining contours also make it possible to carry out further calculations with reliable results, such as in particular calculations for determining the remaining service life of the component or the expected crack growth.

According to one embodiment of the present invention, the slide is made of plastic. Plastic is advantageous on one hand because it is easily worked to produce the slide. Also, the slide can readily be produced by using a rapid prototyping method. In particular, use is made of a plastic with good sliding properties in order to thus facilitate manual moving of the slide along a component.

Preferably, the slide is elongate, and its cross section is essentially constant over its longitudinal extent. This provides a simple slide that is cost-effective to produce.

Advantageously, the slide has projections that extend along the longitudinal extent of the slide and project perpendicular to the longitudinal extent. Such projections serve as a guide while the slide is moved along a component.

According to one embodiment of the present invention, multiple compression spring parts are provided distributed on the slide, project out from the slide and can be moved, counter to a spring force, in the direction of the slide. Compression spring parts of this type make it possible to minimize play between the contour of the component and the contour of the slide.

Advantageously, a handle is arranged on the slide, in particular on an upper region of the slide. Such a handle facilitates manual moving of the slide to effect the traversing movement.

According to one embodiment of the present invention, there is provided an adjustment device which is designed such that it is possible to set multiple pivot positions of the milling tool. Accordingly, various advances of the milling tool can be effected.

Preferably, the adjustment device has a stop which can be securely connected to the pivot axis and projects out from the pivot axis, and whose pivot position is limited by an adjustment means, in particular by an adjustment screw, wherein the stop is preferably releasably connectable to the pivot axis, in particular by means of at least one securing screw. The desired pivot position, in which the stop comes to engage with the adjustment means, can be set by actuation of the adjustment means. A releasable connection between the stop and the pivot axis has the advantage that the adjustment device can be adjusted or zeroed.

Advantageously, the adjustment device has a return spring which is connected to the pivot axis via a lever arm such that the spring force of the return spring acts in the direction of a set pivot position. The milling tool is spring-loaded by means of such a return spring.

Preferably, a pressure means is provided on the slide such that this means can be selectively switched to a position in which it overrides a spring-loading created by the return spring, wherein the pressure means is in particular provided in the form of a screw. Such a pressure means thus makes it possible to selectively relieve the spring-loading created by the return spring.

According to one embodiment of the present invention, there is provided a display device which is designed such that it displays a set pivot position of the milling tool. Accordingly, the advance of the milling tool is easy to operate by a user.

Advantageously, the display device comprises a pointer that can be securely connected to the pivot axis, and a scale to which the pointer points.

In particular, the stop and the pointer are in one piece, so as to achieve a simple construction.

In order to achieve the object stated in the introduction, embodiments of the present invention further provides a method for milling within a slot, in particular within a blade root receiving slot of a turbomachine, using a milling device as claimed in one of the preceding claims, wherein the shape of the slide at least partially matches the shape of the slot that is to be machined, and the slide is inserted in the slot and is moved manually through the slot during milling.

BRIEF DESCRIPTION

Some of the embodiments will be described in detail, with reference to the following figures, wherein like designations denote like members, wherein.

DETAILED DESCRIPTION

Figure 1:
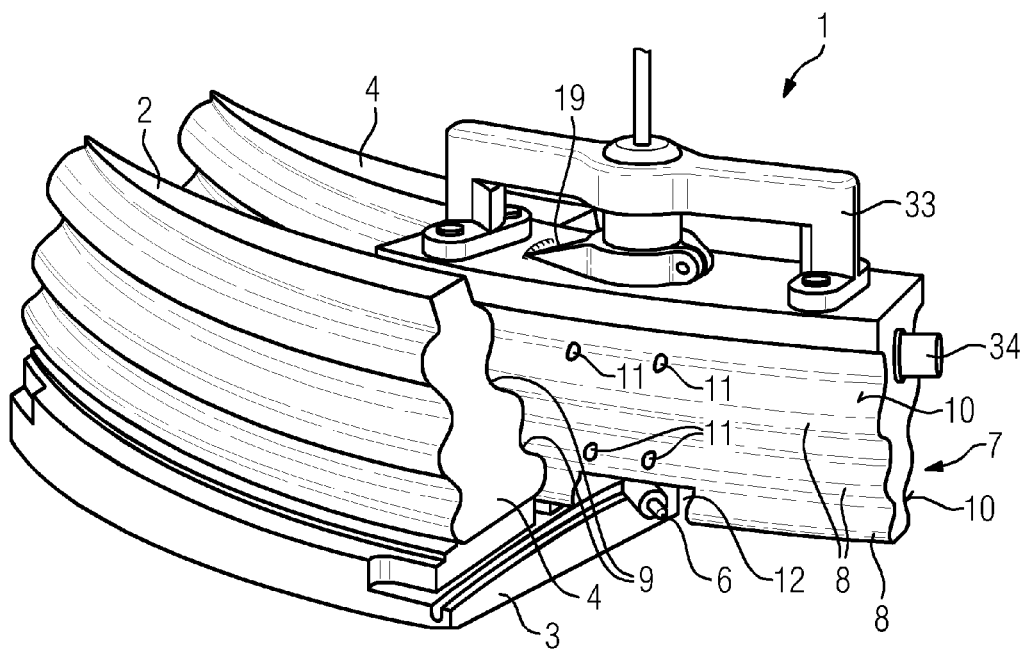
FIG. 1 shows a schematic illustration of a milling device according to one embodiment of the present invention, whose slide is inserted into a slot of a component that is to be machined.
Figure 2:
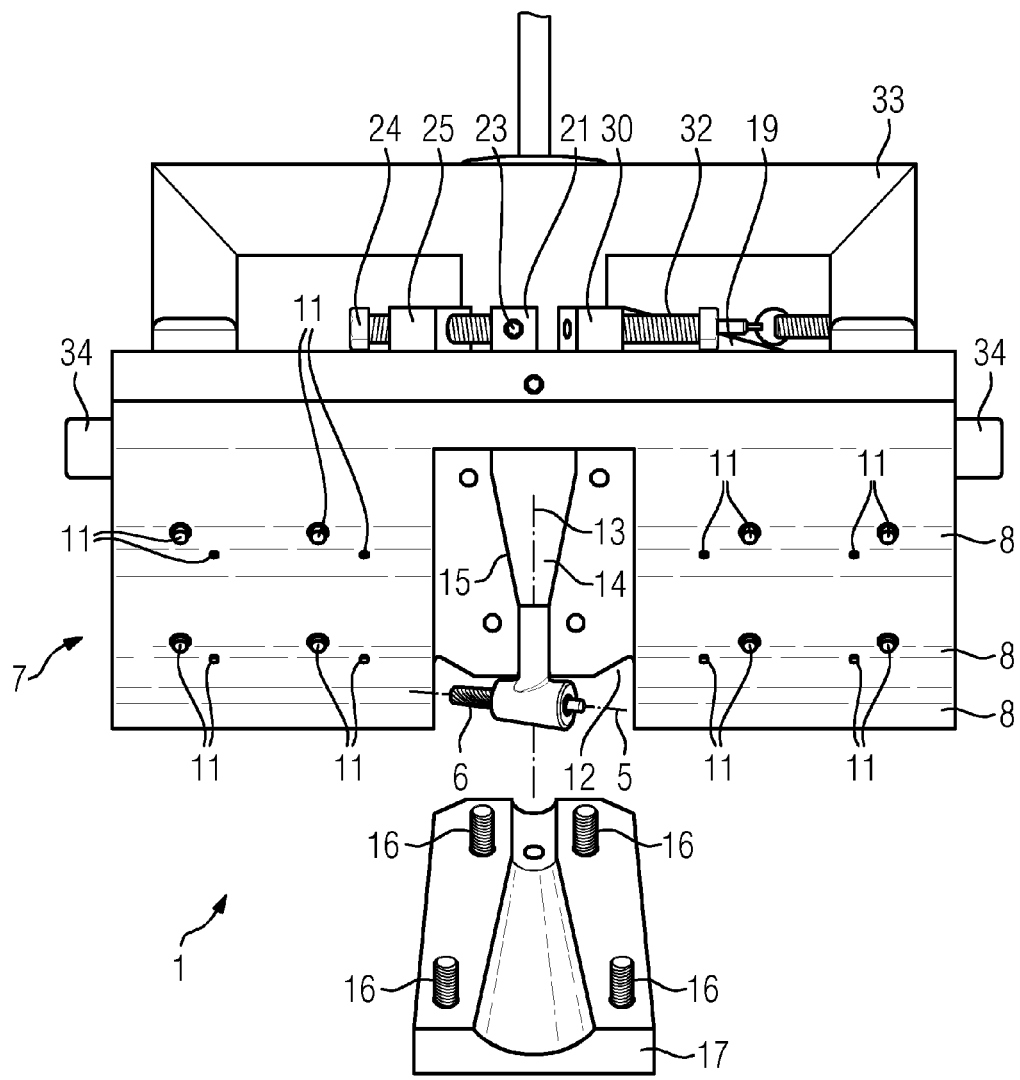
FIG. 2 shows a side view of the milling device illustrated in FIG. 1, with a central cover removed.
Figure 3:
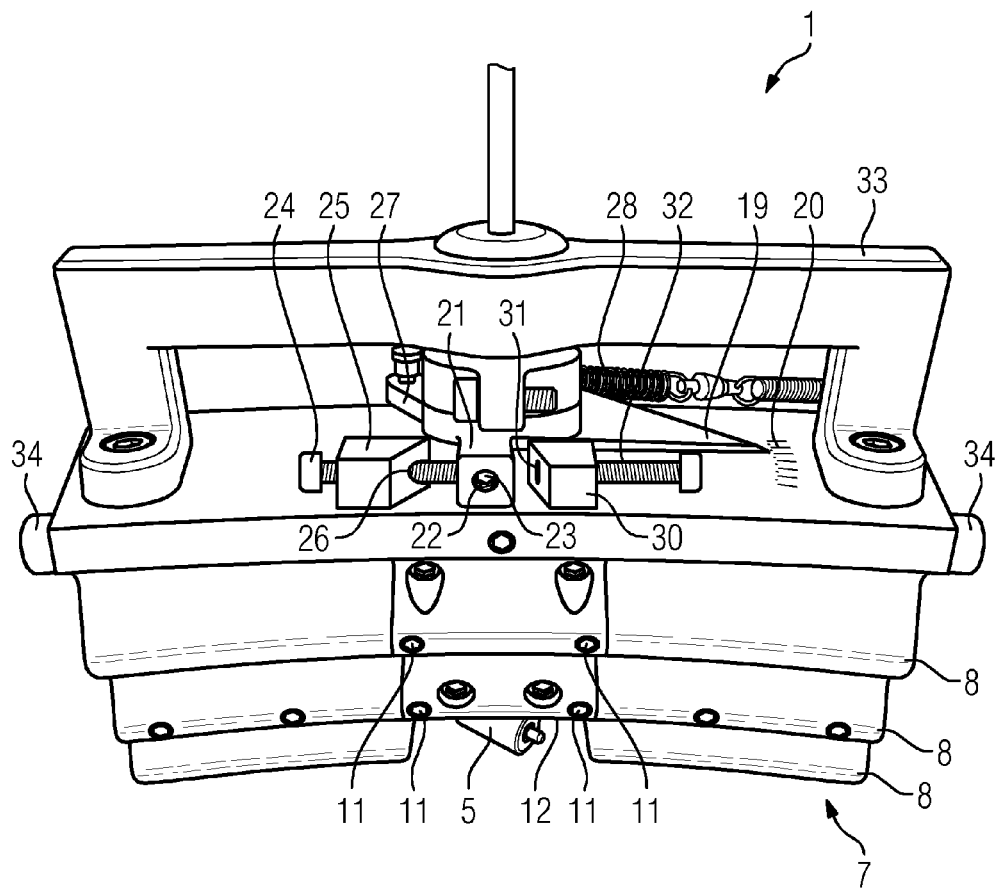
FIG. 3 shows a view similar to FIG. 2, in which the cover is mounted.
Figure 4:
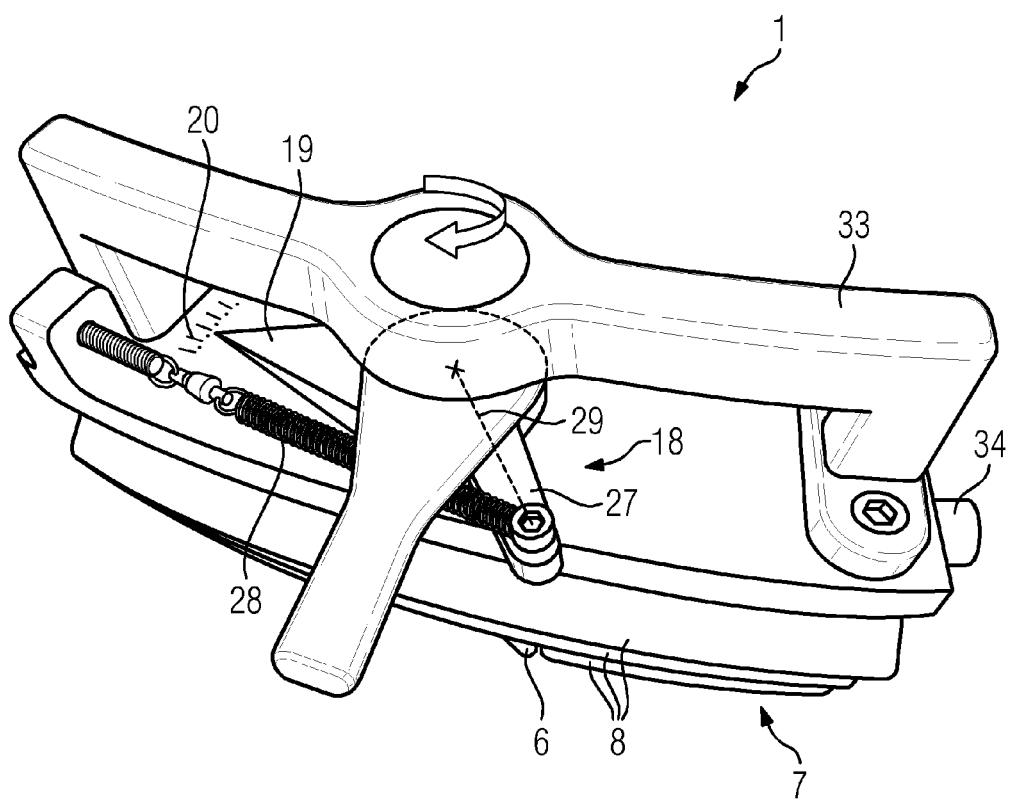
FIG. 4 shows a perspective top view of the milling device illustrated in FIG. 1, from a first side.
Figure 5:
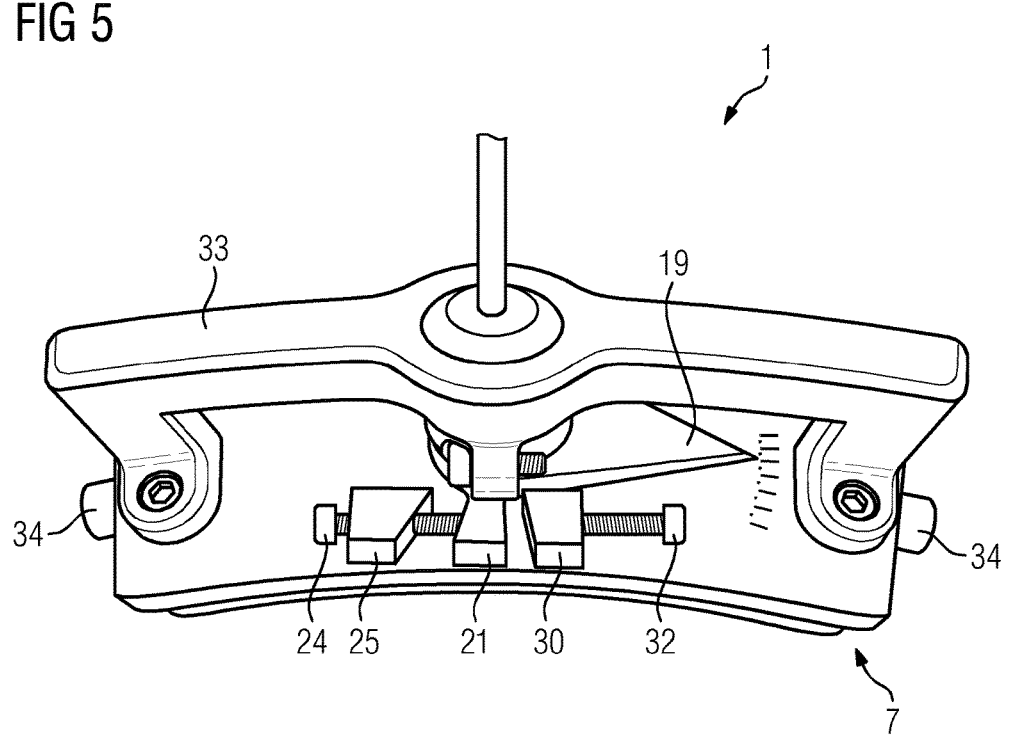
FIG. 5 shows a perspective top view of the milling device illustrated in FIG. 1, from a second side.

The Figures show a milling device 1, according to one embodiment of the present invention, which is configured for milling within a blade root receiving slot 2 of a rotor 3 (only partially shown in FIG. 1) of a turbomachine, in which one sidewall of a rotor steeple 4 that defines the blade root receiving slot 2 is machined in a chip-removing manner. The blade root receiving slots 2 of the rotor 3 are identical and have, in the present case, a constant fir-tree cross section along their longitudinal extent.

The milling device 1 comprises, as principal components, a milling tool 6 (in the present case a finger-type milling cutter) that rotates about a tool rotation axis 5, and a slide 7 holding the milling tool 6.

The slide 7 is elongate, and its cross section, which matches the fir-tree cross section of the blade root receiving slots 2, is essentially constant over its longitudinal extent. Accordingly, the slide 7 can be introduced into a blade root receiving slot 2 and moved through the latter with minimum play, wherein projections 8 on the slide 7, which extend along the longitudinal extent of the slide 7 and project perpendicular to the longitudinal extent, engage in associated depressions 9 in the receiving slots. In order to compensate for the play between the mutually opposite rotor steeples 4 and the slide 7, compression spring parts 11 are provided distributed over the sidewalls 10 of the slide 7, wherein their hemispherical free ends project out from the slide 7 and can be moved, counter to a spring force, in the direction of the slide 7. In the lower region of the slide, there is provided, perpendicular to the longitudinal extent of the slide 7, a cutout 12 in the form of a through-slot. Inside this cutout, the milling tool 6 is held so as to be able to pivot about a pivot axis 13 extending perpendicular to the tool rotation axis 5, such that the milling tool 6 can be moved between a position in which it is completely received in the cutout 12, and a position in which its tip projects by a predetermined amount out from the slide 7, as illustrated for example in FIG. 1. A housing 14, which defines the pivot axis 13 and receives the milling tool 6 at its free lower end, is received in a form-fitting manner in a receiving space 15 formed within the slide 7, which space is accessible via a cover element 17 releasably secured by means of screws 16; the housing 14 extends to the upper side of the slide 7, where it is releasably connected to an adjustment device 18 by means of which various pivot positions of the milling tool 6 can be set manually. The adjustment device 18 comprises a display device that has a pointer 19 which is arranged on the upper side of the slide 7 and can be securely connected to the housing 14, and accordingly to the pivot axis 13, and has a scale 20 arranged on the upper side of the slide 7. A stop 21 is formed in one piece with the pointer 19 and projects, perpendicular to the pivot axis 13, out from the pointer 19 in the direction of one of the sidewalls 10 of the slide 7. A threaded through-hole 22 extends through the stop 21 toward the housing 14, in which there is received a securing screw 23 that creates a releasable connection between the pointer 19 and the housing 14. The pivot position of the stop 21 in the event of a pivot movement of the milling tool 6 about its pivot axis 13 is limited by an adjusting means which, in the present case, consists of an adjustment screw 24 that is received in a threaded hole 26 extending through an upward-projecting relief of the slide 7. A free end of a return spring 28 is attached to an outward-projecting projection 27 of the pointer 19, opposite the stop 21, the other free end of the return spring being held on the slide 7. The position and attachment of the return spring 28 are chosen such that the return spring acts on the pivot axis 13 via a lever arm 29 such that the spring force of the return spring 28 acts in the direction of a set pivot position and presses the stop 21 against the adjustment screw 24. Opposite the relief 25, another upward-projecting relief 30 is formed on the slide 7 such that the stop 21 is positioned between the two reliefs 25 and 30. A threaded hole 31 extends through the relief 30 and receives a pressure means in the form of a pressure screw 32, such that the pressure screw 32 can be brought into contact with the stop 21. In the upper region of the slide 7, there is provided a handle 33 which can be gripped manually by an operator in order to move the slide 7. Suction connectors 34 are formed on the end sides of the slide 7 and can be connected to a suction system (not shown in more detail), wherein the suction connectors 34 are connected to the cutout 12 via air ducts (also not shown in more detail).

For chip-removing machining of a rotor steeple 4, the slide 7 is first placed manually in the corresponding blade root receiving slot 2 and pushed slightly into the blade root receiving slot 2. In that context, the compression spring parts 11 come into contact with the mutually opposite sidewalls of the adjacent rotor steeples 4 and are pushed inward counter to their spring force, thus compensating for play between the rotor steeples 4 and the slide 7. Thereupon, a suction device is connected to the suction connectors 34 and then switched on, thus creating a partial vacuum in the region of the cutout 12. In another step, an advance of the milling tool 6 is set by actuation of the adjustment screw 24 and pivoting of the milling tool about its pivot axis 13 such that it projects out from the cutout 12. The desired degree of the advance can be read using the pointer 19 that points to the scale 20. Now, the milling tool 6 is rotated about its tool rotation axis 5, and the traversing movement of the milling tool 6 is effected by the slide 7 being moved manually through the blade root receiving slot 2. This creates a milled groove along the rotor steeple 4, with resulting chips being removed by suction. The return spring 28 acts in a resilient manner on the milling tool 6 during milling. In the event that this spring-loading is not desired, the spring-loading can be overridden by bringing the pressure screw 32 into engagement with the stop 21. The adjustment device 18 can be adjusted by means of the securing screw 23.

The milling device 1 can in particular be used to machine cracks in the rotor steeples 4, for example to determine a crack depth or to mill out a crack.

Although the present invention has been described in detail with reference to the preferred embodiment, it is to be understood that the present invention is not limited by the disclosed examples, and that numerous additional modifications and variations could be made thereto by a person skilled in the art without departing from the scope of the invention.

It should be noted that the use of "a" or "an" throughout this application does not exclude a plurality, and "comprising" does not exclude other steps or elements. Also elements described in association with different embodiments may be combined. It should also be noted that reference signs in the claims should not be construed as limiting the scope of the claims.

The invention claimed is:

1. A milling device comprising:
   a milling tool that rotates about a tool rotation axis; and
   a slide;
   wherein the milling tool is held on a pivot axis that extends transversely to the tool rotation axis and through the slide, wherein the slide is designed and a position of the milling tool is selected such that, during milling, a traversing movement is effected by manually moving the slide and advance is effected by pivoting the milling tool about the pivot axis.

2. The milling device as claimed in claim 1, wherein the slide is made of plastic.

3. The milling device as claimed in claim 1, wherein the slide is elongate, and a cross-section of the slide is essentially constant over a longitudinal extent of the slide.

4. The milling device as claimed in claim 1, wherein the slide has a plurality of projections that extend along a longitudinal extent of the slide and project perpendicular to the longitudinal extent.

5. The milling device as claimed in claim 1, wherein a plurality of compression spring parts are provided and distributed on the slide, project out from the slide and are configured to be moved, counter to a spring force, in a direction of the slide.

6. The milling device as claimed in claim 1, wherein a handle is arranged on the slide.

7. The milling device as claimed in claim 1, further comprising an adjustment device which is designed such that it is possible to set multiple pivot positions of the milling tool.

8. The milling device as claimed in claim 7, wherein the adjustment device has a stop which is securely connected to the pivot axis and projects out from the pivot axis, and whose pivot position is limited by an adjustment means, wherein the stop is releasably connectable to the pivot axis.

9. The milling device as claimed in claim 7, wherein the adjustment device has a return spring which is connected to the pivot axis via a lever arm such that the spring force of the return spring acts in the direction of a set pivot position.

10. The milling device as claimed in claim 9, wherein a pressure means is provided on the slide such that the pressure means is selectively switched to a position in which the pressure means overrides a spring-loading created by the return spring, wherein the pressure means is a pressure screw.

11. The milling device as claimed in claim 7, further comprising a display device which is designed such that the display device displays a set pivot position of the milling tool.

12. The milling device as claimed in claim 11, wherein the display device comprises a pointer that is securely connected to the pivot axis, and a scale to which the pointer points.

13. The milling device as claimed in claim 12, wherein the stop and the pointer are in one piece.

14. A method for milling within a slot of a turbomachine, using a milling device as claimed in claim 1, wherein a shape of the slide at least partially matches a shape of the slot that is to be machined, and the slide is inserted in the slot and is moved manually through the slot during milling.

15. The milling device as claimed in claim 6, wherein the handle is arranged on an upper region of the slide.

16. The milling device as claimed in claim 8, wherein the adjustment means is an adjustment screw, and the stop is releasably connectable to the pivot axis by means of at least one securing screw.

17. The method as claimed in claim 14, wherein the slot is a blade root receiving slot of the turbomachine.

18. The milling device of claim 1, wherein the slide has a fir-tree cross-section.

19. The milling device of claim 1, wherein the slide guides the milling tool along a defined movement of the milling tool, during milling.

20. The milling device of claim 19, where the defined movement is dependent on a shape of the slide.

* * * * *